June 20, 1967 W. RABUS 3,327,268
SHIELDING RING WITH DEFORMABLE INSULATION CARRIER
Filed June 22, 1964 4 Sheets-Sheet 1
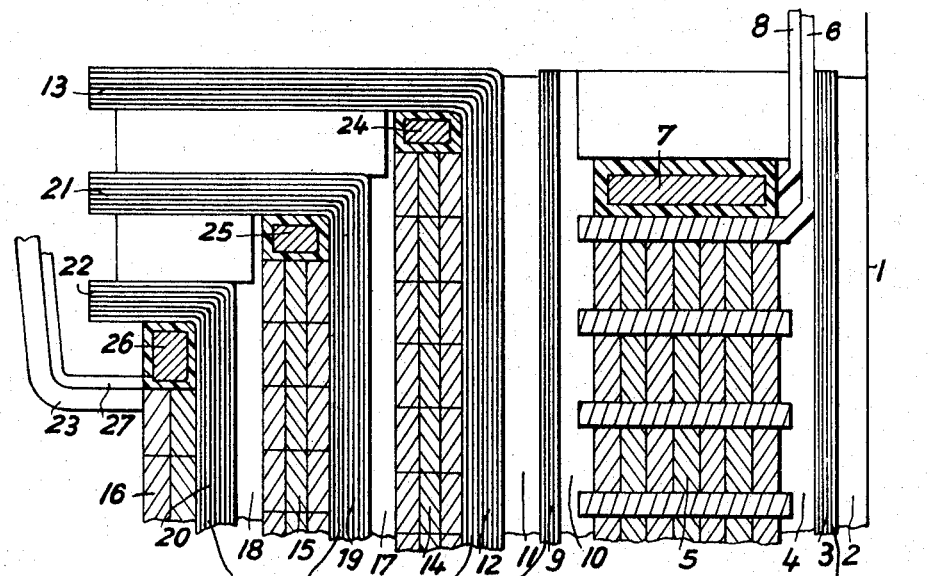
Fig. 1
PRIOR ART
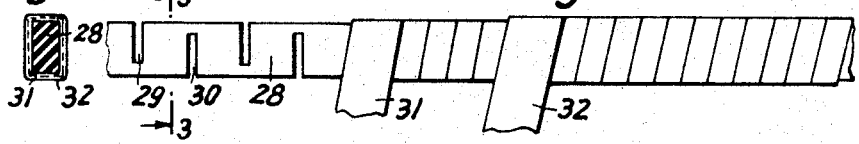
Fig. 3  Fig. 2
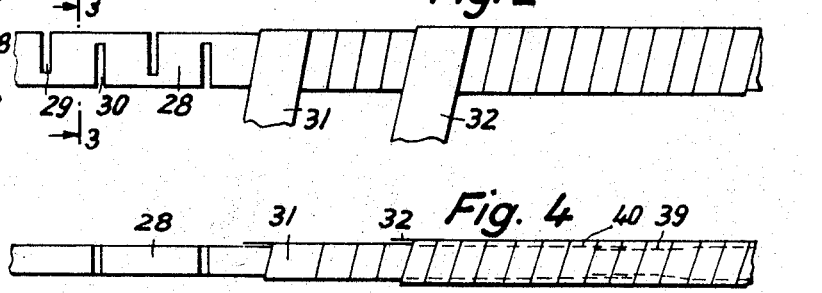
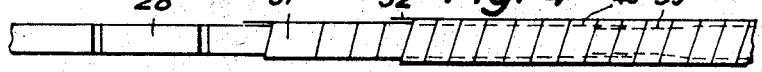
Fig. 4
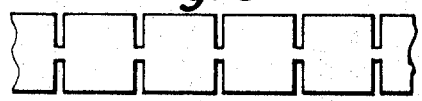
Fig. 6
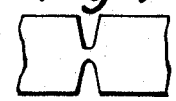
Fig. 7
Inventor:
Willy Rabus
By: Spencer & Kaye
ATTORNEYS

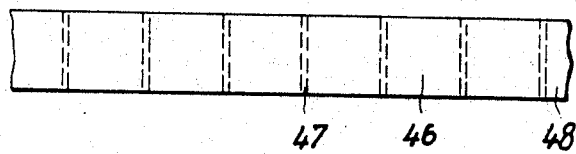
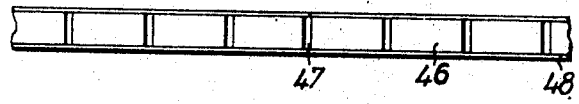
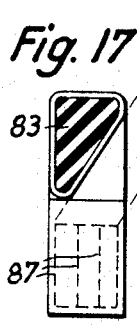
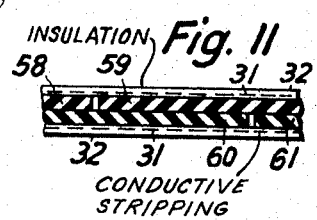
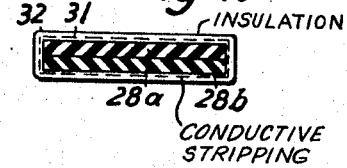
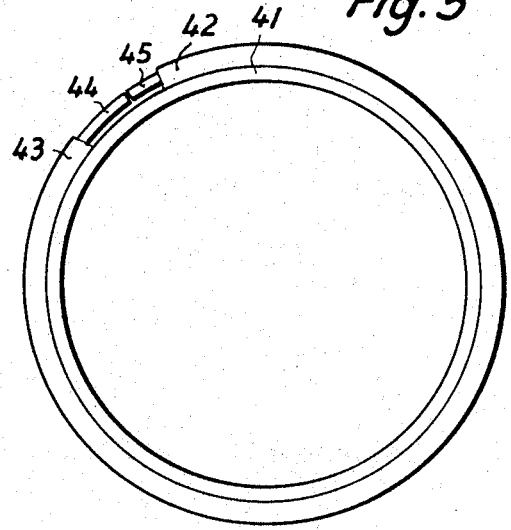
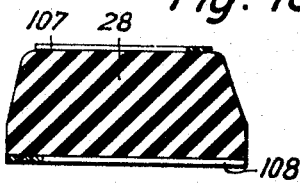
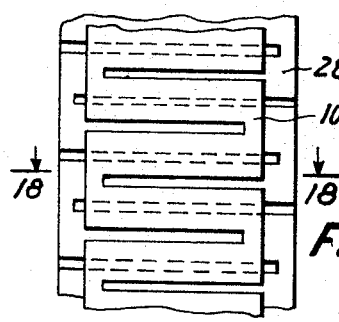

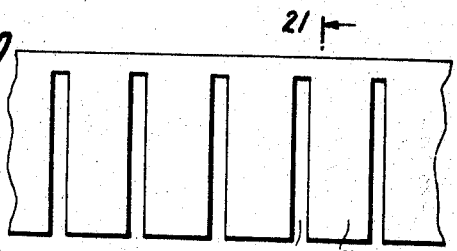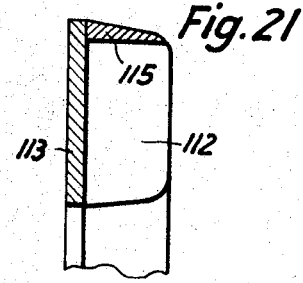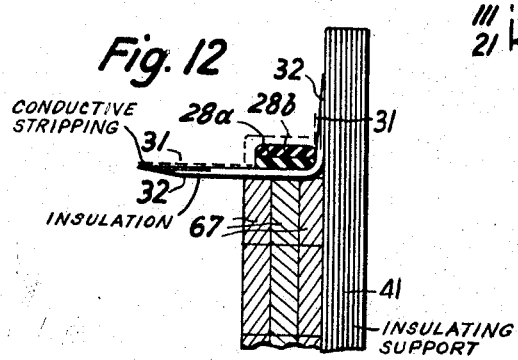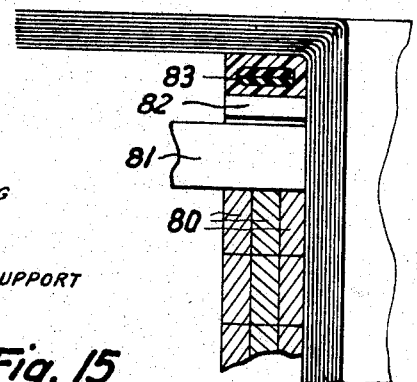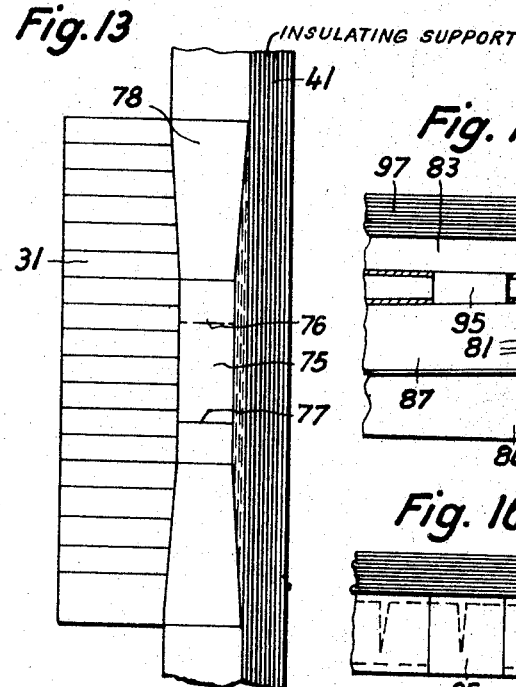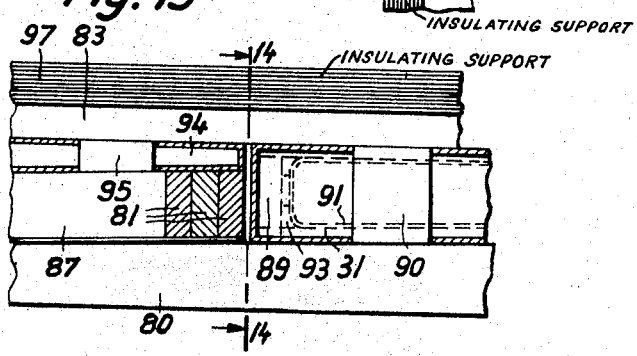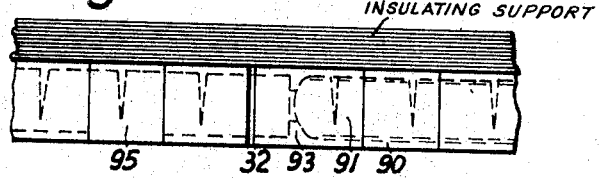

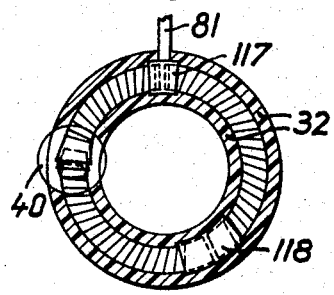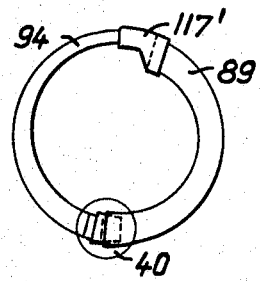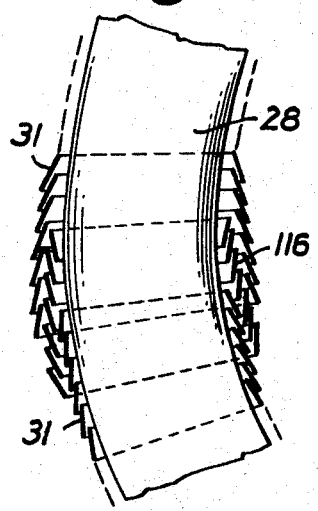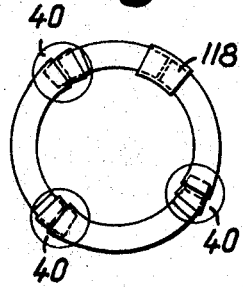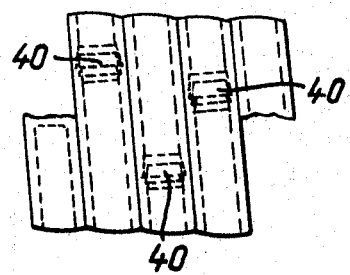

United States Patent Office 3,327,268
Patented June 20, 1967

3,327,268
SHIELDING RING WITH DEFORMABLE
INSULATION CARRIER
Willy Rabus, Stuttgart-Unterturkheim, Germany, assignor to Licentia Patent-Verwaltungs-GmbH, Frankfurt am Main, Germany
Filed June 22, 1964, Ser. No. 376,872
Claims priority, application Germany, June 27, 1963,
L 45,216
20 Claims. (Cl. 336—84)

The present invention relates to a shielding ring having a deformable insulation carrier.

High-voltage apparatus and machinery, such as oil-filled high-voltage transformers, instrument transformers, choke coils, and the like require so-called boundary field insulation. Such insulation is often in the form of so-called shielding rings, and FIGURE 1 shows an oil-filled high-voltage transformer incorporating such shielding rings. The transformer includes an iron core, whose contour is shown at 1, there being support struts 2, an insulating cylinder 3 and spacer struts 4, over which the low voltage windings 5 are wound in the form of individual discs. The lead-out of the low-voltage winding is shown at 6. A heavily insulated ring 7 shields the end of this winding 5, which itself is usually only thinly insulated, with respect to the high-voltage winding. This shielding ring 7 is provided with an outrigger 8 which runs parallel to the lead-out 6. The main insulation with respect to the high-voltage winding is constituted by the insulating cylinder 9, two oil channels 10 and 11 which are formed by spacer struts, as well as by a further insulating cylinder 12 which is wound of soft paper and which has a rent over, disc-like annular flange 13. The manner in which this flange is formed is conventional: after the insulation has been wound onto the equipment, a certain portion is left which extends beyond the edge and this portion is divided into strips by being forcibly rent over so as spatially to deform the insulation, thereby to provide a boundary field insulation.

In the transformer of FIGURE 1, the high-voltage winding is a multiple-layer one constiuted by a plurality of winding layers 14, 15, 16. The layers 14 and 15 of FIGURE 1 consist of three parallel conductors each, while the layer 16 consists of two parallel conductors. The oil channels between layers 14, 15 and 16 are indicated at 17 and 18. The insulation cylinders pertaining to the layers 15 and 16 are shown at 19 and 20, the same having rent over flanges 21 and 22, respectively, the outermost high-voltage layer 16 having a lead-out 23. The ends of the layers 14, 15, 16, have heavily insulated rings 24, 25, 26, joined thereto. Ring 26 is provided with an outrigger 27 which is parallel to the lead-out 23 of the outermost layer 16.

While the shielding rings 7, 24, 25, 26 are quite useful in solving the problems of high-voltage boundary fields, i.e., while they shield the relatively weakly insulated wires of the windings and control the field distribution in the region of the edges of the windings, the fact remains that the manufacture and assembly of such insulation is exceedingly complicated and expensive. For one thing, the shielding rings of FIGURE 1, usually made of metal, such as steel, have a relatively small cross section but a very large diameter, so that they are difficult to work. Furthermore, the rings themselves can not form a closed metallic ring, instead, there has to be a break, the so-called insulation lock, the provision of which is expensive. Furthermore, the rings have to be connected galvanically to the adjacent winding sections which they are to shield. This means that the rings have to be provided with insulated lead-outs, shown in the case of the rings 7 and 26, at 8 and 27, respectively.

Yet another practical problem is that the windings have to conform to very close tolerances, which means that the shielding rings have to be very carefully fitted in with the windings. This has been found to be a time-consuming, difficult and expensive step in the manufacture of the transformer. Indeed, experience has shown that, quite regularly, the finished shielding rings have to be cut open again, have to have their diameters changed, and then have to be insulated once more. The same thing holds true when hard insulation is used as the carrier material for the shielding rings. Due to high pressure exerted during the winding, the rings have to be able to withstand great mechanical forces.

It is therefore, the basic object of the present invention to overcome the above drawbacks. Accordingly, the present invention relates to insulation lined shielding rings, having a carrier or core of hard insulation material, for high-voltage machinery and equipment, particularly oil-filled transformers, measuring transformers, choke coils, and the like, in which the core is constituted by bar means which themselves are constituted by one or more straight bars of strips made of the hard insulating material. The core is provided with cuts, such as slits, or other suitable devices, which allow the core to be easily deformed mechanically. Before the core is bent, it is provided with a conductive layer. Insulation is then provided on the core on all but short end portions thereof which are left free of insualtion, i.e., the conductive layer at the end portions of the core are not covered by any insulation. At at least one point along the length of the core there is an interruption in the conductive layer—this interruption constituting what is hereinafter referred to as the insulation lock—and this interrupted portion of the conductive layer is likewise covered with the insulation lining with which the remainder of the core, except for the end portions, is covered.

The above-described article of manufacture may then be used to make the shielding ring, namely, by applying, i.e., bending it about the part to be shielded. The ends of the core may then be joined by a fastening sleeve which itself includes conductive means which galvanically contact the end portions of the core which are uncovered by insulation. The sleeve is otherwise insulated.

Additional objects and advantages of the present invention will become apparent upon consideration of the following description when taken in conjunction with the accompanying drawings in which:

FIGURE 1, already referred to above, shows the prior art.

FIGURE 2 is a top view of one embodiment of an article according to the present invention.

FIGURE 3 is a sectional view taken on line 3—3 of FIGURE 2.

FIGURE 4 is a side view of the article shown in FIGURE 2.

FIGURE 5 shows how the initially elongated article is formed about the piece of electrical equipment to be shielded.

FIGURE 6 shows a modified core such as may be used in an article according to the present invention.

FIGURE 7 shows another modification of a core such as may be used in an article according to the present invention.

FIGURE 8 is a top view of another embodiment of an article according to the instant invention.

FIGURE 9 is a side view of the article of FIGURE 8.

FIGURE 10 is a transverse sectional view of another embodiment of an article according to the present invention.

FIGURE 11 is a longitudinal sectional view of the joined ends of the core of the article according to FIGURE 10.

FIGURE 12 is a sectional view showing how the article is applied to a piece of equipment.

FIGURE 13 is a plan view of the arrangement shown in FIGURE 12.

FIGURE 14 is a sectional view showing a particular application of the article to a piece of electrical equipment, and is taken on line 14—14 of FIGURE 15.

FIGURE 15 is a side view of the arrangement shown in FIGURE 14.

FIGURE 16 is a plan view of the structure of FIGURE 15.

FIGURE 17 is a sectional view showing the article when formed into a shielding ring used in conjunction with an obliquely leading out winding turn.

FIGURE 18 is a sectional view of yet another embodiment of an article according to the present invention, and is taken on line 18—18 of FIGURE 19.

FIGURE 19 is a plan view of the article of FIGURE 18.

FIGURE 20 is a plan view of a core used in still another embodiment of an article in accordance with the present invention.

FIGURE 21 is a sectional view taken on line 21—21 of FIGURE 20.

FIGURE 22 is a cross-sectional view of another embodiment according to the present invention.

FIGURE 23 is a detail view of the region 40 of FIGURE 22.

FIGURE 24 is a diagrammatic view of another embodiment according to the present invention.

FIGURE 25 is a digrammatic view of still another embodiment of the present invention.

FIGURE 26 is a partial view of yet another embodiment according to the present invention.

Referring once again to the drawings, FIGURE 2 thereof shows the structure of a shielding ring according to the present invention. The same includes a core in the form of a strip, rod or bar 28 made of hard insulating material, such as hard press board, which is provided with a large number of evenly distributed cuts or slits, arranged on opposite sides and mutually displaced from each other. Two of these cuts are shown at 29 and 30. Before this core is deformed, the same has wound thereon a layer of conductive material such as strip 31, which conductive layer is covered by one or more further layers of insulation, one of which further layers is shown at 32. The cross section of the thus prefabricated and still undeformed "shielding bar" is shown in FIGURE 3. As before, the core of the bar itself is shown at 28, the conductive layer at 31, and the insulation overlying the conductive layer is shown at 32.

As shown in FIGURE 4, which is a side view of the shield bar of FIGURES 2 and 3, the conductive layer can easily be provided with an interruption. As indicated at 39 and 40, all that is necessary is that two overlying strip sections be separated from each other at one point by insulated stripping having a thickness of about 0.5 to 1 mm., the insulating strip being wound thereon. Thanks to the overlapping, the interruption does not cause any non-uniformity in the electric field.

It is known, in the case of press board strips which serve as spacers between the turns of transformer windings, to provide unilateral saw-tooth like cuts or stampings, thereby to allow the strips to be bent, in the plane of their two greatest dimensions, to form circles or arcuate segments without there being any buckling.

The length of the shielding bars according to the present invention is selected to be such as to allow the bar to be bent about the end of the turn to be shielded, with some overlap. The end portions of the bars, about 30 mm. in length, are at first left completely without any stripping. The conductive stripping is left to protrude about 15 to 20 mm. and is then stepped in a wedge-like manner. The insulated lining is cropped. The insulation lock is arranged approximately in the middle, so that after a bar is bent into the configuration of a ring, the free ends of the bar can be joined by a prefabricated covering sleeve whose innermost layer consists of electrically conductive material and whose next layer or layers are insulation, thereby completing the galvanic connection as well as providing the complete insulation.

FIGURE 5 shows how the shielding bars are fit to one of the windings, whose support is indicated at 41. The ends of the shielding bar which are covered by the conductive stripping and the insulation lining are indcated at 42 and 43, while the extreme free end portions of the bar which still remain to be connected galvanically and which are to be covered with insulation are indicated at 44 and 45.

FIGURE 6 shows that the core may be provided with aligned rather than staggered opposite cuts, while FIGURE 7 shows the provision of wedge-shaped cut-outs.

In FIGURES 8 and 9, the deformable shielding bar has a core made of blocks 46 of hard insulating material, which blocks are arranged in a line but are spaced small distances 47 from each other. The blocks 46 are held together by two cover strips 48 made of flexible or elastic material, the same being suitably secured to the blocks, such as by adhesive.

The shielding ring core according to FIGURES 8 and 9 readily lends itself to mass-production techniques. One practical way is to place a number of long strips next to each other, with some spacing, to provide cover sheets at the top and bottom and to secure them to the strips, and then to cut the structure transversely, thereby obtaining a corresponding number of cores each as shown in FIGURES 8 and 9.

The embodiment shown in FIGURE 10 allows the ends of the bars which have been bent around to form the shielding ring to be joined very easily. Here, the cores of the bars are made of two overlapping strips 28a and 28b about which are bound the same conductive stripping 31 and insulation 32. The ends are then joined by letting the two strips overlap, as shown in FIGURE 11 in which the juncture of the ends 58 and 59 of the upper strip 28a is about 30 mm. to the left of the juncture of the ends 60 and 61 of the lower strip 28b.

The juncture of the ends of a shielding ring having a core according to FIGURES 10 and 11 is shown in FIGURES 12 and 13. The winding support is shown at 41 and the last turn of the winding at 67. The junction sleeve shown in FIGURE 12 is, beginning with the conductive strips which come into galvanic contact with the conductive layer on the core of the shielding ring, placed about the core. The insulation lining of the fastening sleeve is thereafter placed about the core which is now completely covered with the conductive strip, care being taken that, by proper overlapping, the electrical strength is preserved. In FIGURE 13, the place whereat the two shielding ring core strips 28a, 28b, overlap is indicated at 75, 76 being the lower butt joint and 77 the upper, while 78 is the wedge-shaped, stepped insulation lining.

FIGURES 14, 15 and 16 show a shielding ring arrangement in which the pitch of the winding is compensated for by a wedge-shaped shielding ring, there being a second, closed shielding ring of uniform thickness for providing the actual shielding against the high-voltage boundary field. In FIGURE 14, the penultimate turn of the winding layer is shown at 80, 81 being the radially outwardly extending lead-out of the winding layer. The end of the wedge-shaped shielding ring is shown at 82 while the cross section of the shielding ring proper is shown at 83, the same containing two core strips. The turn 87 has a lead-out 81. The pitch of the last turn is compensated for by a wedge-shaped shielding ring which, at its wide end 89, has a height equal to about 1.2 that of the turn conductor. Here, the wedge-shaped shielding ring is secured to the end of the turn by means of a loop 90. The contour of the ring core is shown at 91, the conductive layer 31 being drawn inwardly, at 93, through an opening in the shielding ring core, whereat it is covered with insulation. In this way, the problem relating to insulating a dead end is solved. The narrow end 94 of the shielding ring is secured to the winding by a loop 95. The normally configured shielding ring is indicated at 83, the horizontally angled insulating flange at 97.

For the sake of simplicity, the winding section which is actually an arcuate segment is shown, in FIGURES 13 and 16, as being straight. This, however, is only for purposes of illustration.

As stated above, the shielding rings 7, 24, 25, 26, of FIGURE 1 are generally connected galvanically to the ends of the windings to be shielded. The same applied to the shielding rings according to the present invention, although according to a further feature of the present invention, these shielding rings are not connected galvanically but only capacitatively to the respective ends to be shielded. This eliminates the shielding ring lead-outs and their connection. Furthermore, by properly selecting the height of the shielding ring, the coupling relationship to the turns to be shielded can always be such that capacitatively obtained shielding ring potential is very close to the end turn of the winding to be shielded, so that the insulation between the shielding ring and the end of the winding to be shielded can readily be so selected that the relatively small potential difference is easily managed. This, it will be appreciated, allows the electrical boundary fields to be controlled even better than is possible with rigid galvanic connections.

The two shielding rings used in the embodiment of FIGURES 14, 15 and 16 can likewise be capacitatively coupled. Here it is pointed out that in FIGURE 15 only the right, high end of the wedge-shaped shielding ring is shown with its conductive layer 31. The left, narrow end of the shielding ring is assumed to have had its conductive layer connected, at a point at which the shielding ring is still somewhat wider, in a manner similar to that in which the conductive layer at the right, wide end is connected.

In the case of certain winding constructions, the winding lead-outs will not be at right angles to the winding axis but, as shown in FIGURE 17, be oblique thereto. Thus, the end 87 of the last turn runs into an upwardly and obliquely extending lead-out 81, it being at this place that the shielding ring 83 has to be provided with an opening or recess through which the lead-out may extend. These openings, which may at times leave only very small shielding ring cross sections, can be made of metal and the metallic connecting pieces will then be connected, on both sides, with the insulation carriers, i.e., the cores, of the ring as per the present invention. The metallic connecting piece will, of course, be galvanically connected with the conductive stripping of the shielding ring.

The shielding rings 7, 24, 25, 26, of FIGURE 1 have a generally rectangular cross section, with rounded edges. In practice, however, the shielding rings can have any other desired cross-sectional configuration, which can be obtained by working the core or by combining differently formed cores. Such a core is shown in FIGURE 18 which is suitable for use with high-voltage tube windings having a rated voltage of about 100 kilovolts. The core has a generally rectangular cross section whose upper side is trapezoidally tapered and provided with rounded corners having large radii. The main core is shown at 28, there being upper and lower strips 107 and 108. FIGURE 19 shows that the main core 28 as well as the upper covering strip 107 are provided with a series of cuts, arranged on opposite sides and mutually staggered. As shown in FIGURE 19, the cuts of the main core 28 are staggered with respect to those of the strip 107. In practice, the lower strip 108—not shown in FIGURE 19—will be provided with similar cuts which can likewise be staggered.

FIGURES 20 and 21 show a shielding ring similar to that of FIGURES 18 and 19, but differing therefrom in that the main core has slits 111 on but one side to leave webs 112. In order to obtain good stability of such a ring, the main core may be placed onto a ring disc of hard insulation, such as hard press board, to obtain the cross-sectional configuration shown in FIGURE 21 which depicts a press board disc 113 having a thickness of several millimeters. The webs 112 of the main core are held together by a belt 115.

The conductive stripping of a shielding ring according to the present invention can be made of a thin metal band. In the case of smaller ring cross sections, the metal can be copper or brass, while in the case or rings of larger cross section, the use of nickel silver has been found to be well suited since the same has a high ohmic resistance but low eddy current losses. Alternatively, the conductive stripping can be constituted by conductive paper, such as carbon-type paper. Such paper may or may not be provided with loosely interspersed metal stripping, or with one longitudinal metallic band. Yet another possibility is to let the conductive stripping be constituted, wholly or in part, of conductive lacquer with which the core is coated.

Under certain circumstances, the core may first be taped with a firm textile or plastic band, so as to enable the shielding ring better to take up the mechanical stresses to which it is subjected. If the ring is to be subjected to very high mechanical stresses, the taping can be constituted by a resin-soaked glass fiber band which is then hardened.

The above deals with closed ring-shaped shielding rings as well as with open shielding rings (FIGURES 15 and 16). The present invention is equally applicable to shielding rings which are wound spirally onto an end of a winding. The dead end of such a ring may then be arranged somewhat as the right end of the ring of FIGURE 15. A wedge-shaped filler piece may be used to compensate for the pitch.

In the case of such spiral-shaped shielding rings, the conductive layer will, at given spacings, be provided with interruptions—constituting the insulation locks—thereby to obtain a particularly good boundary field insulation. In this way, the wound shielding ring receives good insulation strength throughout its length, and the greater the number of insulation locks included in the ring, the higher the insulation strength.

It was stated in connection with the embodiment of FIGURE 17 that metallic insets could be used to advantage for bridging the lead-outs. A similar inset can be used for bridging the last turn pitch stage. Thus, in the case of the lead-out in the embodiment of FIGURES 14, 15 and 16, a filler inset would be provided to connect the thick end 89 of the shielding ring with the thin end 94, this inset being galvanically connected with the conductive layer. Finally, the inset is provided with insulating tape. The opening of the shielding ring, or its attaching point, as the case may be, is then equal to approximately the average thickness of the shielding rings.

FIGURE 22 is an axial cross-sectional view of a finished shielding ring produced according to the present invention and provided with insulation wrapping 32. At the location of winding output 81, the shielding ring is interrupted and the interruption is filled by a suitably chosen metallic insert 117 which conductively connects the two adjacent shielding ring ends together. The extremities of the originally straight shielding ring body which come together when the body is bent into a ring are inserted into a suitable conductive sleeve 118 which connects the conductive layer ends together. The insulation 32 is made continuous at this location. The region 40 of FIGURE 22 represents an insulation lock for preventing a winding short circuit and as shown in detail to enlarged scale in FIGURE 23.

Referring now to FIGURE 23, there is shown a shielding ring core 28 around which is disposed a conductive layer 31. As may be seen, this conductive layer is interrupted and the end of the conductive layer stripping is covered, over a certain width, by an insulating material layer stripping 116. Outside the stripping 116 the conductive layer 31 is continued and overlaps the end of what now can be considered the inner conductive layer. While these two conductive layers are now conductively insulated from each other by the insulation 116, the resulting arrangement represents an electrostatically closed shielding surface.

Referring now to FIGURE 24, there is shown the configuration for a conductive junction between a narrow shielding ring end 94 and a wide shielding ring end 89, which are formed in a manner similar to that shown in FIGURE 15, by means of a metallic insert 117'. The region 40 is provided with an insulation lock of the type shown in detail in FIGURE 23.

FIGURE 25 shows a modified arrangement employing three such insulation locks and a closing sleeve 118.

In FIGURES 24 and 25, the outer insulation layer 32 has been omitted for purposes of simplicity and the circular outlines of the ring represent the conductive layers.

Finally, FIGURE 26 shows a spirally wound shielding ring according to the present invention which is provided with three insulation locks 40. In this embodiment, the individual sections assume a greater potential and permit a good field control to be effected.

It will be understood that the above description of the present invention is susceptible to various modifications, changes, and adaptations, and the same are intended to be comprehended within the meaning and range of equivalents of the appended claims.

What is claimed is:

1. An article of manufacture which is deformable for ultimate use as a shielding ring for high-voltage electrical equipment in which a boundry field is to be shielded, said article comprising, in combination: elongated core means made of insulating material, said core means being provided with means which render said core means easily mechanically deformable; said core means being provided with a conductive layer, said conductive layer being provided with an interruption at at least one point along the length of said core means thereby to provide an insulation lock; said core means, throughout the entire length thereof except for short end portions thereof, being further provided with insulation which covers said core means except for said end portions, in consequence of which said core means, together with said conductive layer and insulation, are rendered mechanically deformable about an electrical component to form a shielding ring for a boundary field.

2. In combination with the article defined in claim 1 having a ring shape, a fastening sleeve for joining the ends of the core means, said sleeve including conductive means galvanically contacting the end portions of said core means which are uncovered by said insulation, said sleeve being otherwise insulated.

3. The article defined in claim 1 wherein said core means comprise one bar.

4. The article defined in claim 1 wherein said core means comprise a plurality of bars.

5. The article defined in claim 4 wherein said core means has the configuration of a ring and said bars are constituted by strips made of insulating material, said strips overlapping each other.

6. The article defined in claim 1 having a ring shape and having a wedge-shaped configuration for compensating for the pitch of a winding the end of which the article is to shield.

7. The article defined in claim 1 having a ring shape with a dead end, said conductive layer, at said dead end, extending into the interior of said core means and being covered with insulation.

8. The article defined in claim 1 provided with at least one recess and a metallic inset lining the same.

9. The article defined in claim 1, further comprising insulated taping for mechanically reinforcing said core means, said conductive layer being applied on said taping.

10. The article defined in claim 9 wherein said taping is made of a textile material.

11. The article defined in claim 9 wherein said taping is made of glass fiber impregnated with a hardenable resin.

12. The article defined in claim 1 wherein said conductive layer is provided with a plurality of interruptions along the length of said core means thereby to provide a plurality of insulation locks.

13. In combination: a piece of electrical equipment requiring boundary field insulation; and shielding means disposed on said piece of equipment for providing such insulation, said shielding means having a ring shape and being formed from the article defined in claim 1.

14. In combination: a piece of electrical equipment including a winding requiring boundary field insulation; and a shielding ring arranged at the end of said winding, said ring being formed from the article defined in claim 1.

15. The combination defined in claim 14 wherein said ring is galvanically connected to said winding.

16. The combination defined in claim 14 wherein said ring is galvanically disconnected from said winding.

17. The combination defined in claim 14 wherein said ring is a spiral and forms a continuation of said winding.

18. The combination defined in claim 14, there being a plurality of shielding rings, said shielding rings and said winding being capacitatively coupled to each other.

19. A shielding ring having a circular shape and being formed from the article defined in claim 1.

20. The article defined in claim 9 wherein said taping is made of plastic.

References Cited

UNITED STATES PATENTS 2,724,735  11/1955  Johnston _____ 174—35

LEWIS H. MYERS, *Primary Examiner.*

T. J. KOZMA, *Assistant Examiner.*